United States Patent [19]

Brazeal

[11] Patent Number: 5,564,725
[45] Date of Patent: Oct. 15, 1996

[54] PNEUMATICALLY OPERATED SLIDER LOCKING MECHANISM

[75] Inventor: Russell S. Brazeal, Mansfield, Mo.

[73] Assignee: Hutchens Industries, Inc., Springfield, Mo.

[21] Appl. No.: 544,303

[22] Filed: Oct. 17, 1995

[51] Int. Cl.⁶ ........................................ B60G 5/00
[52] U.S. Cl. ................ 280/149.2; 180/209; 280/407.1
[58] Field of Search .......................... 280/149.2, 405.1, 280/407.1, 482, 80.1; 180/209, 24.02, 24.01

[56] References Cited

U.S. PATENT DOCUMENTS

| | | |
|---|---|---|
| 2,818,272 | 12/1957 | De Lay . |
| 2,835,504 | 5/1958 | Acker . |
| 2,888,297 | 5/1959 | Ridgway . |
| 2,962,295 | 11/1960 | Tenenbaum . |
| 3,087,741 | 4/1963 | De Lay . |
| 3,177,002 | 4/1965 | Schmidt . |
| 3,372,946 | 3/1968 | Hutchens . |
| 3,931,987 | 1/1976 | Holliday . |
| 3,963,259 | 6/1976 | Massey . |
| 4,273,347 | 6/1981 | Hulse . |
| 4,286,797 | 9/1981 | Mekosh, Jr. et al. . |
| 4,353,565 | 10/1982 | Smith et al. . |
| 4,531,753 | 7/1985 | Hicks . |
| 4,641,846 | 2/1987 | Ehrhart . |
| 4,838,566 | 6/1989 | Baxter et al. ................. 180/209 X |
| 4,838,578 | 6/1989 | Baxter . |
| 4,865,341 | 9/1989 | Hicks . |
| 4,919,445 | 4/1990 | Robey . |
| 4,944,552 | 7/1990 | Hart . |
| 4,958,845 | 9/1990 | Parks . |
| 4,993,737 | 2/1991 | Torcomian . |
| 5,137,296 | 8/1992 | Forman . |
| 5,199,732 | 4/1993 | Lamuls et al. ............... 280/407.1 |
| 5,232,234 | 8/1993 | McCombs . |
| 5,314,201 | 5/1994 | Wessels . |
| 5,346,233 | 9/1994 | Moser . |
| 5,449,190 | 9/1995 | Ford ........................... 280/407.1 |
| 5,451,069 | 9/1995 | Schueman ................... 280/149.2 |
| 5,480,171 | 1/1996 | Cheffey ....................... 280/149.2 |

Primary Examiner—Christopher P. Ellis
Attorney, Agent, or Firm—Cushman, Darby & Cushman

[57] ABSTRACT

A wheeled vehicle is provided including a trailer body and a tandem wheel assembly including a frame supporting a portion of the trailer body for relative longitudinal sliding motion with respect thereto to vary the longitudinal position of support. A pin locking system is carried by the tandem wheel assembly to selectively lock the trailer body and tandem wheel assembly in a selected longitudinal position of support. The locking system includes a plurality of pins mounted on the frame for movement between extended and retracted positions. A linkage mechanism is carried by the frame and is constructed and arranged with respect to the pins to move the pins between the extended and retracted positions thereof in response to movement of said linkage mechanism from an operative position to an adjusting position thereof. An actuating assembly is carried by the frame constructed and arranged to move the linkage mechanism between its operative position and its actuating position. The actuating assembly includes a manually actuated pull rod which operates a pneumatically actuated unit to move the linkage mechanism from an operative position to actuating positions to retract the pins.

13 Claims, 2 Drawing Sheets

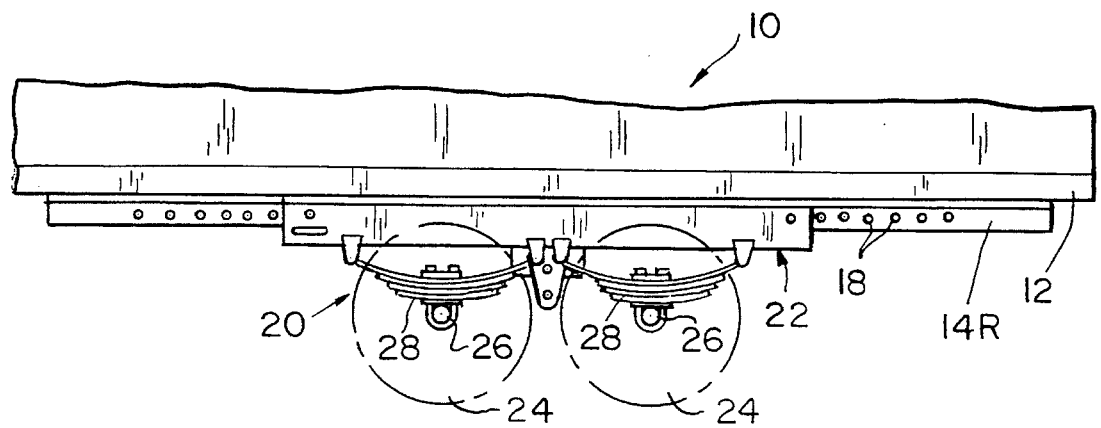
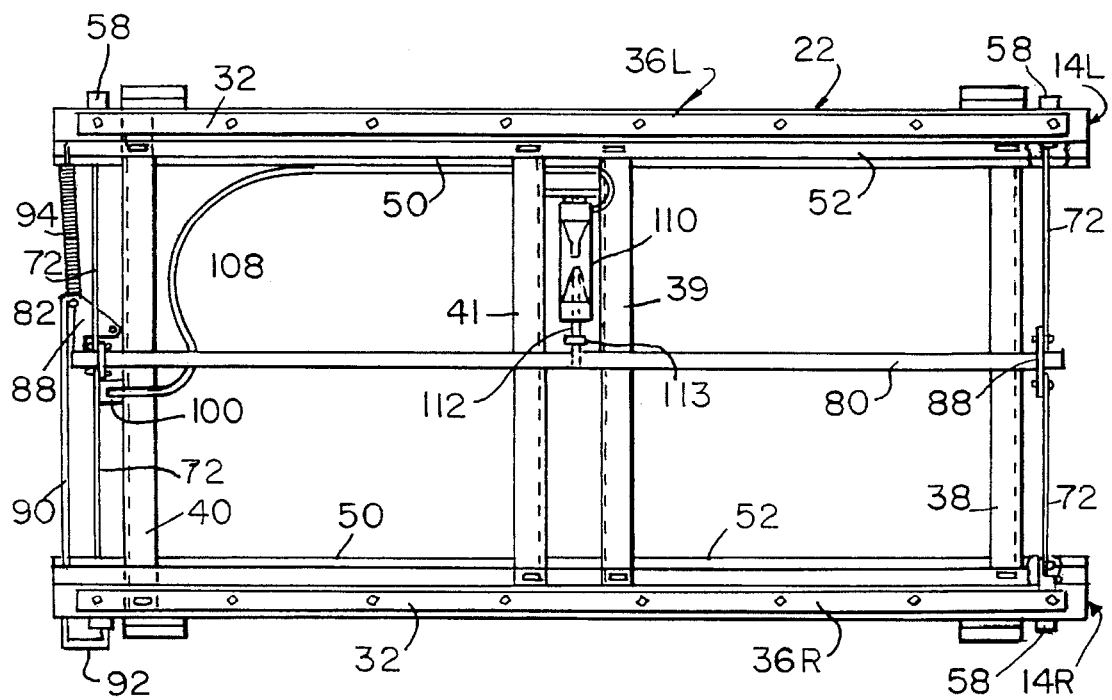

PNEUMATICALLY OPERATED SLIDER LOCKING MECHANISM

BACKGROUND OF THE INVENTION

This invention relates to sliders for adjustment of the suspension of a wheeled vehicle longitudinally with respect to a trailer body of the vehicle, and more particularly, to a pneumatically actuated system for facilitating such adjustment.

Frequently, tandem axle trailers and like vehicles cannot always be loaded equally throughout their length with the result that the loads bearing on the wheels supporting the vehicle are not always uniform. Many prior devices have been devised to compensate for this unbalanced load condition. Typically, the device for compensating an unbalanced load must be adjustable while the vehicle is loaded, for it is only at this time that the operator of the vehicle can determine the correct position for equally distributing the load. Since the variation of position must be accomplished when the vehicle is loaded, the means connecting the sub-frame to the vehicle must be adapted to allow such adjustment in a relatively easy manner while under the influence of a substantial load. Conventional slider devices used for this purpose typically comprise a pair of side rails secured at the left and right sides of the vehicle trailer in a fixed position extending longitudinally of the trailer, and a sub-frame which carries the suspension comprising left and right slide members slidable of the trailer on the side rails. Typically, a plurality of locking pins lock the sub-frame in various positions of adjustment relative to the side rails. The locking pins are retractable, permitting adjustment of the sub-frame to selected positions of adjustment and may be extendable for locking the sub-frame in a selected position of adjustment. A linkage is provided for moving the locking pins from the extended position to a retracted position and from the retracted position to the extended position. Typically, the linkage is operable to retract the pins by manually moving a pull rod which extends laterally outwardly from the side of the sub-frame.

The pull rod and linkage design described above has been used for many years, but has a serious drawback. The manual force required to pull the pull rod and thus move the linkage to retract the pins is significant, particularly when the trailer is fully loaded as friction between the trailer and pins is increased. Further, the pins may become frozen or rusted into position making them extremely difficult to move by a manually inputted force.

Pneumatic devices, supplied with pressurized air from the brake system of the vehicle, have been developed to facilitate locking pin retraction. However, the operator must be trained to use such devices since they deviate from the conventional device which is actuated by merely moving the standard pull rod.

Accordingly, a need exists to provide a slider locking system for retracting and extending locking pins of a slider sub-frame to permit adjustment of a suspension of a vehicle longitudinally of the body of the vehicle which may be operated with minimal effort by the operator and which requires no further user instruction in order to operate the system.

SUMMARY OF THE INVENTION

It is an object of the invention to fulfill the need described above. In accordance with the principles of the present invention, this object is achieved by providing a wheeled vehicle including a trailer body including a pair of longitudinally extending members having a series of longitudinally spaced openings formed therein, a tandem wheel assembly including a frame supporting a portion of the trailer body for relative longitudinal sliding motion with respect thereto to vary the longitudinal position of support and a pin locking system carried by the tandem wheel assembly cooperable with the openings to selectively lock the trailer body and tandem wheel assembly in a selected longitudinal position of support.

The locking system includes a plurality of pins mounted on the frame for movement between extended and retracted positions, the pins being constructed and arranged to engage within selected openings of the series of openings when in the extended position thereof to thereby retain the tandem wheel assembly in a selected position of longitudinal adjustment with respect to the trailer body.

A linkage mechanism is carried by the frame and is constructed and arranged with respect to the pins to move the pins between the extended and retracted positions thereof in response to movement of the linkage mechanism from an operative position to an adjusting position thereof.

An actuating assembly is also carried by the frame and is constructed and arranged to move the linkage mechanism between its operative position and its actuating position. The actuating assembly includes a manually movable actuating member mounted with respect to the frame to be movable generally longitudinally between an inoperative and an operating position extending outwardly from the frame in such a manner to simulate movement of a heretofore manually movable member of the type which, when moved generally longitudinally, effects direct movement of the pins between their extended and retracted positions.

A normally closed air operated valve is carried by the frame and is constructed and arranged to be connected with a source of air under pressure such that movement of the actuating member from its inoperative position to its operating position opens the valve. A pneumatically actuated unit is mounted on the frame and is coupled to the linkage mechanism so as to move the linkage mechanism from its inoperative position thereof to its adjusting position thereof. The pneumatically actuated unit is pneumatically connected to the valve.

The actuating assembly is constructed and arranged with respect to the linkage mechanism such that the actuating member may be grasped and moved manually from its inoperative position to its operating position without moving the pins, so as to open the valve and communicate the source of air with the pneumatically actuated unit thereby moving the linkage mechanism from its operative position to its adjusting position. The linkage mechanism in turn moves the pins from the extended position thereof into the retracted position thereof.

Further, movement of the actuating member from its operating position to its inoperative position permits the valve to close thereby releasing the pressurized air from the pneumatically actuated unit which permits the linkage mechanism to move from its adjusting position to its operating position and permits the pins to move from the retracted position thereof into the extended position thereof within a selected opening.

In accordance with another aspect of the invention, a method of varying a longitudinal position of a tandem wheel assembly of a vehicle with the structure disclosed above is provided.

Another object of the present invention is the provision of a slider locking system of the type described which is simple in construction, effective in operation and economical to manufacture and maintain.

These and other objects of the present invention will become more apparent during the course of the following detailed description and appended claims.

The invention may be best understood with reference to the accompanying drawings wherein an illustrative embodiment is shown.

BRIEF DESCRIPTION OF THE DRAWINGS

FIG. 1 is a side elevational view of a portion of a trailer body of a wheeled vehicle and a slider sub-frame supporting a portion of the trailer body incorporating a locking system, provided in accordance with the principles of the present invention;

FIG. 2 is a plan view of a locking system carried by the sub-frame for retracting and extending locking pins to permit adjustment of the suspension of the vehicle longitudinally of the vehicle;

DETAILED DESCRIPTION OF THE PRESENTLY PREFERRED EXEMPLARY EMBODIMENT

Figure 3:
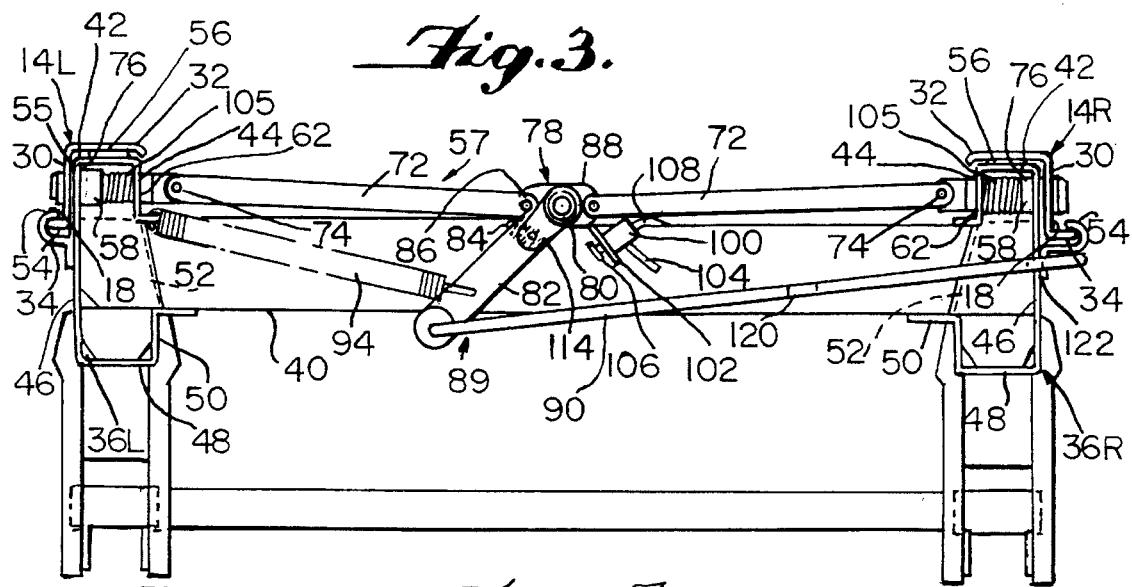
FIG. 3 is a side elevational view of the locking system of FIG. 2, shown in a operative position wherein the locking pins are in an extended position locking the sub-frame in fixed relation to the trailer body.

Referring now to more particularly the drawings, there is shown therein a side elevational view of a portion of a wheeled vehicle 10 including a trailer body 12 including a pair of longitudinally extending members 14R, 14L fixed to the bottom of the trailer body 12 at the left and right sides thereof. The extending members 14R, 14L include a series of longitudinally spaced openings 18 formed therein, the function of which will become apparent below.

The trailer body 12 is supported by a tandem wheel assembly 20 including a slider sub-frame 22 which supports a portion of the trailer body for relative longitudinal sliding motion with respect to the trailer body 12 to vary the longitudinal position of support. The sub-frame 22 includes tandem wheels 24 rotatably mounted on axles 26 which are suspended by springs 28.

As best shown in FIG. 3, each extending member 14R, 14L is generally Z-shaped in cross-section and has a generally vertical portion 30, an upper inwardly directed horizontal flange portion 32 and a lower outwardly directed horizontal flange 34. As shown in FIG. 2, the sub-frame 22 is of generally rectangular configuration and carries the suspension and includes left and right slide members 36L and 36R, respectively, and front and rear cross-beams 38, 40 and a pair of central cross beams 39 and 41 interconnecting the slide members. The slide members 36L, 36R are slidable longitudinally of the trailer body 12 on the extending members 14L, 14R. In the illustrated embodiment shown in FIG. 3, each slide member 36L, 36R has an upper inwardly directed horizontal flange 42 spaced below the upper horizontal flange portion 32 of the extending member, a lip 44 bent downwardly from the inner end of the upper horizontal flange 42, a generally vertical side wall 46 disposed inwardly of vertical portion 30 of the extending member, a lower inwardly directed flange 48, and a lip 50 bent upwardly from the inner end of the lower flange 48. A reinforcing member 52 spans lip 44 and lip 50. A plurality of hooked-shaped members 54 are affixed to the side walls 46 of the slide members 36L, 36R so as to overlie the lower horizontal flanges 34 of respective extending members 14L, 14R to permit the sub-frame 22, carrying the suspension, to be slidably adjustable relative to the extending members 14L, 14R. In the illustrated embodiment, a pad 56 is disposed between the horizontal flange portion 32 of the extending member and the horizontal flange 42 of the slide member to ensure a low friction, close-sliding fit between the two members. A rectangular washer 55 is affixed between the vertical flange 30 and side wall 46.

A pin locking system, carried by the tandem wheel assembly 20 and generally indicated at 57, includes a plurality of locking pins 58 provided for locking the sub-frame 22 to the extending members 14L, 14R in various positions of adjustment relative thereto. In the illustrated embodiment, four locking pins are provided and, as shown in FIG. 2, two pins 58 are disposed at the front of the subframe 22 and two pins 58 are disposed at the rear of the sub-frame 22 opposite the extending members 14L, 14R.

The downwardly extending lip 44 includes a bore 62 for receiving the locking pin 58 in a slidable manner. The locking pins 58 are mounted for linear horizontal movement in a direction transverse to the trailer body 12 and are retractable so as to permit adjustment of the sub-frame 22 to various positions of adjustment relative to the extending members 14L, 14R. The locking pins 58 may be extended for locking the sub-frame 22 and thus the tandem wheel assembly 20 in a selected position of adjustment to compensate for a particular loading of the trailer body 12.

As shown in FIG. 3, when a locking pin 58 is in its extended position it extends through opening 62 in the downwardly extending lip 44, opening 76 in the side wall 46 of the slide member, through rectangular washer 55 and then through one of the series of longitudinally spaced openings 18 in the associated extending member.

The locking system 57 includes a linkage mechanism, generally indicated at 78, carried by the sub-frame 22 of the tandem wheel assembly 20. The linkage mechanism 78 is constructed and arranged to be moved between an operative position (FIGS. 3 and 4) and an adjusting position (FIG. 5), as will be explained below. The linkage mechanism 78 includes a shaft 80 extending longitudinally of the sub-frame 22 and generally parallel to the extending members 14L, 14R and midway therebetween. The shaft 80 is journalled in the cross-beams 38–41 for rotation as will become apparent below. A linkage 72 is coupled to each locking pin 58 via a pin 74. End 86 of each linkage 72 is rotatably coupled to a cam 88. As shown in FIG. 2, the cam 88 is rotatably coupled to the shaft 80 at both the front and rear of the subframe 22.

An actuating assembly, generally indicated at 89, is provided to move the linkage mechanism 78 between its operative and adjusting positions. In the illustrated embodiment, the actuating assembly includes a crank arm 82 coupled at the rearward end of the shaft 80 so as to be free to turn on the shaft 80. The crank arm 82 carries a spring-loaded actuator 84 having a seating surface 86, the function of which will become apparent below. The actuating assembly 89 also includes an actuating member 90 rotatably coupled to the crank arm 82 at an end opposite the crank arm and shaft connection. Thus, since the crank arm 82 is free to turn on shaft 80, the connection between the actuating member 90 and the shaft 80 is a lost-motion connection.

Figure 4:
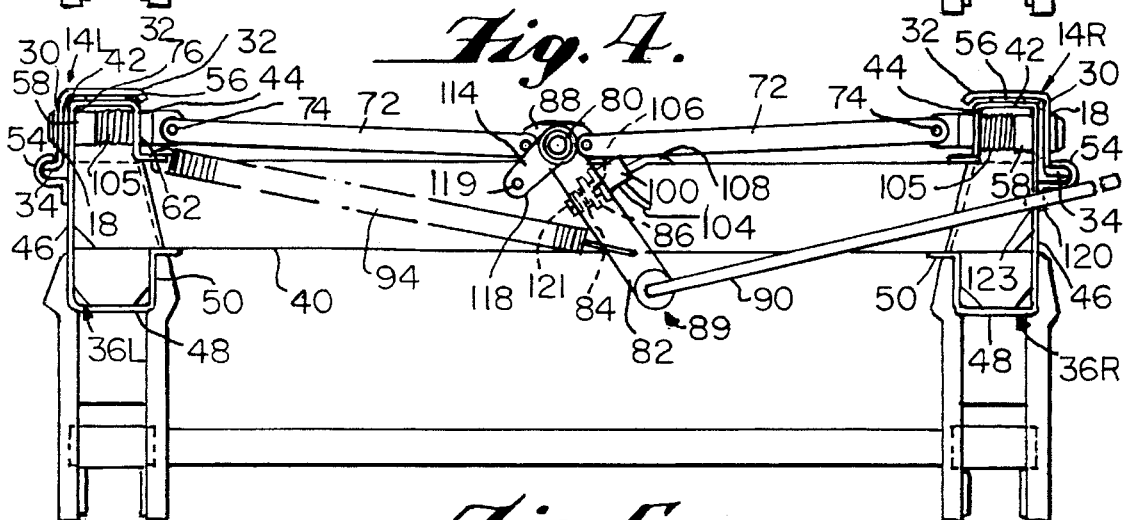
FIG. 4 is a view similar to FIG. 3, showing an actuating member moved to an operating position to open a valve.

The actuating member 90 is in the form of a an elongated, conventional pull rod and extends generally transversely with respect to the trailer body 12 outwardly through openings in the side wall 46 of the right slide member 36R at the rear of the sub-frame. The proximal end of the actuating member 90 is bent to form a handle 92 which may be grasped and manually pulled outwardly, generally longitudinally, from an inoperative position shown in FIG. 3, to an operating position extending outwardly from the sub-frame 22 as shown in FIG. 4. Thus, the actuating member is movable in such a manner so as to simulate movement of a heretofore manually movable member of the type which, when moved generally longitudinally, effects direct retraction and extension of locking pins, as for, example the pull rod disclosed in U.S. Pat. No. 3,372,946, the disclosure of which is hereby incorporated into the present specification by this reference.

A handle return spring 94 is disposed between a lower portion of the crank arm 82 and lip 44 of the slide member 36L.

An air operated valve 100, of the actuating assembly 89, is mounted to the sub-frame 22 via bracket 102 and is supplied with a source of air under pressure, through air line 104. Air line 104 is fluidly coupled with the vehicle braking air system (not shown). The valve 100 includes a valve stem 106 which is normally biased outwardly such that the valve is in a normally closed position. In the illustrated embodiment, the valve 100 is fluidly connected, via air line 108, with a power operated or pneumatically actuated unit in the form of a piston and cylinder unit 110 mounted on the subframe 22 between the central cross members 39 and 41. The shaft 112 of the piston and cylinder unit 110 is coupled to a lever 113 which in turn is coupled to the shaft 80 of the linkage mechanism 78 in any conventional manner such as, for example, as disclosed in U.S. Pat. No. 5,232,234, the disclosure of which is hereby incorporated into the present specification by reference. Thus, linear movement of shaft 112 of the unit 110 will cause shaft 80 to rotate and thus move the linkage mechanism 78 from its operative position to its adjusting position, as will be explained in detail below.

Figure 5:
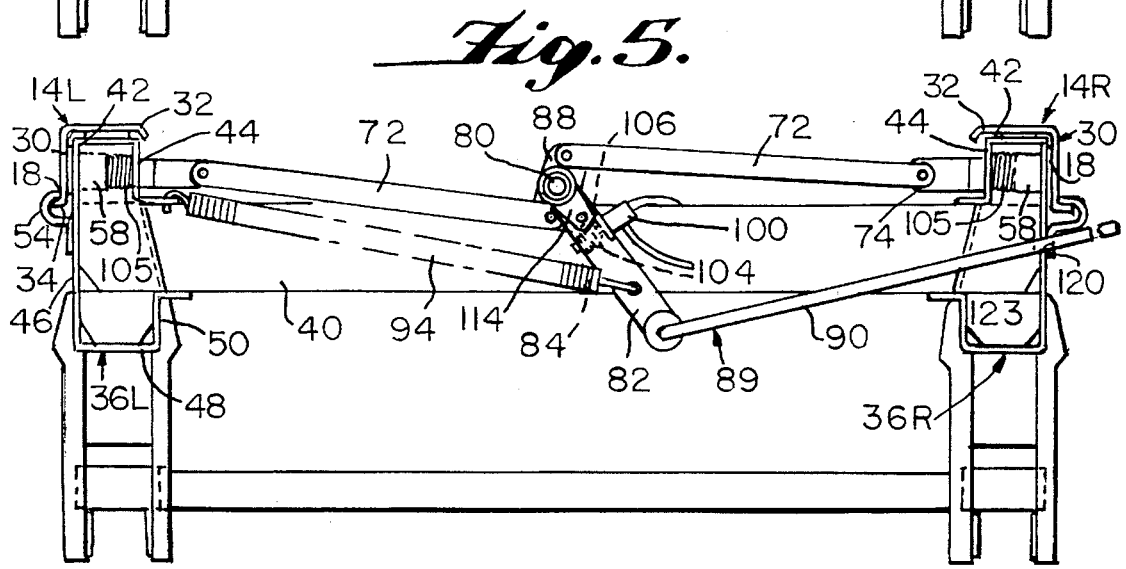
FIG. 5 is view similar to FIG. 4, showing the locking system moved to an adjusting position wherein the locking pins are moved to a retracted position.

When it is desired to move the tandem wheel assembly 20 with respect to the trailer body 12 so as to accommodate a different load of the vehicle, the handle 92 is manually grasped and the actuating member 90 is pulled outwardly from its inoperative position against the bias of spring 94 to its operating position extending outwardly in the direction of the length of the actuating member 90, which in turn rotates of the crank arm 82, without rotating shaft 80. In this position, seat 86 of the actuator 84, mounted on the crank arm 82, engages the valve stem 106 of valve 100 thus opening the valve 100 and communicating air with the piston and cylinder unit 110 to move the piston and shaft 112 thereof linearly which in turn causes rotation of shaft 80, moving linkages inwardly to an adjusting position and effecting retraction of the locking pins 58, as shown in FIG. 5.

The actuating member 90 includes a notch 120 which may engage side wall 46 of slide member 36R in any conventional manner to lock the actuating member 90 in its operating position. The vehicle may then be moved forwardly or rearwardly to align with desired openings 18 in the extending members 14R, 14L to distribute the load within the trailer body 12 uniformly. Thereafter, the actuating member 90 is moved manually, generally longitudinally, from its operating position to its inoperative position, with spring 94 continuously biasing the actuating member 90 towards its inoperative position. This movement rotates the crank arm 82 toward its first position thereby releasing seat 86 from engagement with the valve stem 106. This closes the valve 100 causing the piston and cylinder unit 110 to exhaust. Compression springs 105 are coupled to each locking pin 58 between a surface of each pin and the lip 44 for biasing each locking pin to its extended position shown in FIG. 3. Thus, when the linkage mechanism 78 is in an operative position, the actuating member 90 is in its inoperative position and may be conventionally locked with respect to the sub-frame 22 in any known manner, for example, with notch 122 engaged with the side wall 46 of the sub-frame 22. As a result, the sub-frame 22 and thus the tandem wheel assembly 20 is retained in a selected position of longitudinal adjustment with respect to the trailer body 12.

The locking system 57 is constructed and arranged such that in the event that the locking pins 58 are unable to re-engage openings 18, the actuating member 90 will not fully return to its first position. This will provide the operator with a visual indication that the locking pins 58 are not fully engaged with the sub-frame 22.

Thus, it can be appreciated that the operator merely needs to overcome the force of the return spring 94 to initiate movement of the locking pins from their extended position to their retracted position. Once the actuating member 90 is moved enough to cause the actuator 84 on the crank arm 82 to open valve 100, pneumatic power is used to retract the pins. Further, no additional training of the vehicle operator is required to use the pneumatically operated system, since any operator trained to use the known manual system will be able to use the system of the invention. This is true since each system merely requires manually moving the actuating member or pull rod longitudinally to its conventional, extended position to initiate retraction of the pins.

In the illustrated embodiment, the actuating assembly 89 further includes a link 114 which is coupled to the shaft 80 at one end thereof with the other end 118 of the link 114 being a free end. Since the crank arm 82 is free to turn on the shaft 80, movement of the actuating member 90 from its inoperative position to its operating position causes the crank arm 82 to move from its first position to its second position without rotating the shaft 80. Thus, the locking pins 58 will not move from their extended position. However, in the event of failure of the pneumatic system, the lost motion connection between the crank arm 82 and shaft 80 may be selectively made a pivot connection upon coupling the free end 118 of the link 114 to the crank arm 82. This connection can be made by inserting a pin or the like into bore 119 in the link 114 and through bore 121 in the crank arm 82. Since the link 114 will turn the shaft 80, rotation of the crank arm 82 by manual movement of the actuating member 90 from its inoperative position to its operating position will now cause direct rotation of the shaft 80 and movement of the linkage mechanism 78 to its adjusting position to retract the locking pins 58 in the conventional manner.

Thus, it will be appreciated that the objects of this invention have been fully and effectively accomplished. It will be realized, however, that the foregoing preferred embodiment of the present invention has been shown and described for the purposes of illustrating the structural and functional principles of the invention and is subject to change without departure from such principles. Therefore, this invention includes all the modifications encompassed within the spirit and scope of the following claims.

What is claimed is:

1. A wheeled vehicle comprising:
   a trailer body including a pair of longitudinally extending members having a series of longitudinally spaced openings formed therein, a tandem wheel assembly including a frame supporting a portion of said trailer body for relative longitudinal sliding motion with respect thereto to vary the longitudinal position of support, a pin locking system carried by said tandem wheel assembly cooperable with said openings to selectively lock said trailer body and tandem wheel assembly in a selected longitudinal position of support, said locking system comprising:

a plurality of pins mounted on said frame for movement between extended and retracted positions, said pins being constructed and arranged to engage within selected openings of said series of openings when in the extended position thereof to thereby retain said tandem wheel assembly in a selected position of longitudinal adjustment with respect to said trailer body, and a linkage mechanism carried by said frame constructed and arranged with respect to said pins to move the pins between the extended and retracted positions thereof in response to movement of said linkage mechanism from an operative position to an adjusting position thereof, and an actuating assembly carried by said frame constructed and arranged to move said linkage mechanism between its operative position and its actuating position, said actuating assembly including:

an elongated manually movable actuating member mounted with respect to said frame so as to be movable generally longitudinally between an inoperative and an operating position extending outwardly from said frame in such a manner to simulate movement of a heretofore manually movable member of the type which, when moved generally longitudinally, effects direct movement of the pins between their retracted and extended positions, a normally closed air operated valve carried by said frame and constructed and arranged to be connected with a source of air under pressure such that movement of said actuating member from its inoperative position to its operating position opens said valve, and a pneumatically actuated unit mounted on said frame and being pneumatically connected to said valve, said pneumatically actuated unit being coupled to said linkage mechanism so as to move said linkage mechanism from its inoperative position thereof to its adjusting position thereof when said pneumatically actuated unit is supplied with the pressurized air, said actuating assembly being constructed and arranged with respect to said linkage mechanism such that said actuating member may be grasped and moved manually from its inoperative position to its operating position without moving said pins, so as to open said valve and communicate said source of air with said pneumatically actuated unit thereby moving said linkage mechanism from its operative position to its adjusting position, said linkage mechanism in turn moving said pins from the extended position thereof into the retracted position thereof, and movement of the actuating member from its operating position to its inoperative position permitting said valve to close thereby releasing the pressurized air from said pneumatically actuated unit permitting said linkage mechanism to move from its adjusting position to its operating position and permitting said pins to move from the retracted position thereof into the extended position thereof within a selected opening.

2. The wheeled vehicle according to claim 1, wherein said actuating member is a pull rod extending generally transversely to the trailer body and constructed and arranged to be manually grasped and pulled.

3. The wheeled vehicle according to claim 2, wherein said linkage mechanism includes a shaft mounted for rotation and extending longitudinally of the frame and generally parallel to said extending members and a plurality of linkages having first and second ends, said pneumatically actuated unit being coupled to said shaft so as to rotate said shaft, said actuating assembly including a crank arm coupled to said shaft so as to be free to turn with respect thereto thereby defining a lost motion connection, said pull rod being coupled to said crank arm, each of said first ends of said linkages being coupled to said shaft, each of said second ends of said linkages being associated with a pin, whereby when said pull rod is moved from its inoperative position to its operating position, said crank arm is rotated from a first position to a second position, said crank arm being constructed and arranged with respect to said valve so as to engage and open said valve when said crank arm is in its second position to supply the source of air to said pneumatically actuated unit to rotate said shaft and thereby dispose said linkage mechanism in its adjusting position.

4. The wheeled vehicle according to claim 3, wherein said crank arm includes an actuator coupled thereto, said actuator being constructed and arranged to engage said valve so as to open said valve when said crank arm is in its second position.

5. The wheeled vehicle according to claim 4, wherein said crank arm is constructed and arranged such that rotation of said crank arm from said second position to said first position thereof releases said actuator from engagement with said valve and thereby closes said valve which causes said pneumatically actuated unit to exhaust enabling said linkage mechanism to return to its operating position effecting movement of said pins to the extended position thereof.

6. The wheeled vehicle according to claim 3, wherein said pull rod is constructed and arranged to be locked with respect to said frame in its operating position thereof.

7. The wheeled vehicle according to claim 3, wherein a return spring is coupled between the frame and the crank arm for biasing the pull rod towards its inoperative position.

8. The wheeled vehicle according to claim 3, wherein said actuating assembly further comprises a link pivotally coupled to said shaft at one end thereof in such a manner so as to rotate the shaft upon movement of the link, with the other end of the link being a free end, said link enabling said lost motion connection to be selectively made a pivotal connection upon coupling said free end to said crank arm such that rotation of said crank arm from its first position to its second position by manual movement of said pull rod from its inoperative position to its operating position causes direct rotation of said shaft via said link and movement of said linkage mechanism to its adjusting position to move said pins from their extended position to their retracted position.

9. The wheeled vehicle according to claim 1, further comprising a compression spring coupled to an associated pin in such a manner to continuously bias the associated pin to its extended position thereof.

10. The wheeled vehicle according to claim 1, wherein said pneumatically actuated unit comprises a piston and cylinder unit.

11. A method of varying a longitudinal position of a tandem wheel assembly of a vehicle, the tandem wheel assembly including a frame supporting a portion of a trailer body, the trailer body including a pair of longitudinally extending members having a series of longitudinally spaced openings formed therein, the frame being constructed and arranged for relative longitudinal sliding motion with respect to the trailer body to vary the longitudinal position of support, a pin locking system being carried by the tandem wheel assembly and being cooperable with the openings to selectively lock the trailer body and tandem wheel assembly in a selected longitudinal position of support, the vehicle including a locking system including a plurality of pins mounted on the frame for movement between extended and retracted positions, the pins being constructed and arranged to engage within selected openings of the series of openings when in the extended position thereof to thereby retain the tandem wheel assembly in a selected position of longitudinal adjustment with respect to the trailer body, a linkage mechanism being carried by said frame constructed and arranged with respect to said pins to move the pins between the extended and retracted positions thereof in response to movement of said linkage mechanism from an operative position to an adjusting position thereof, an actuating assembly being carried by said frame and including a manually movable actuating member mounted with respect to said frame in such a manner so as to be movable generally longitudinally between an inoperative position and an operating position extending outwardly from said frame in such a manner to simulate movement of a heretofore manually movable member of the type which, when moved generally longitudinally, effects direct movement of the pins between their retracted and extended positions, a normally closed air operated valve carried by said frame and constructed and arranged to be connected with a source of air under pressure such that movement of said actuating member from its inoperative position to its operating position opens said valve, and a pneumatically actuated unit mounted on said frame and being pneumatically connected to said valve, said pneumatically actuated unit being coupled to said linkage mechanism so as to move said linkage mechanism from its inoperative position thereof to its adjusting position thereof, the method including:

manually moving said actuating member generally longitudinally from its inoperative position to its operating position thereof without moving said pins, thereby causing said valve to open so as to communicate said source of air to said pneumatically actuated unit to move said linkage mechanism from its operative position to its adjusting position thereby moving said pins from the extended position thereof into the retracted position thereof, moving said trailer body longitudinally with respect to said frame to vary the longitudinal position of support of the vehicle, aligning said pins with said openings, and manually moving said actuating member generally longitudinally from its operating position to its inoperative position thereby causing said valve to close and said pneumatically actuated unit to exhaust permitting said locking mechanism to return to its operative position and said pins move from the retracted position thereof into the extended position thereof within a selected opening.

12. In a wheeled vehicle having a trailer body including a pair of longitudinally extending members having a series of longitudinally spaced openings formed therein, a tandem wheel assembly including a frame supporting a portion of the trailer body for relative longitudinal sliding motion with respect thereto to vary the longitudinal position of support, a pin locking system carried by the tandem wheel assembly cooperable with the openings to selectively lock the trailer body and tandem wheel assembly in a selected longitudinal position of support, the locking system including a plurality of pins mounted on the frame for movement between extended and retracted positions, the pins being constructed and arranged to engage within selected openings of the series of openings when in the extended position thereof to thereby retain the tandem wheel assembly in a selected position of longitudinal adjustment with respect to the trailer body, and a linkage mechanism carried by the frame constructed and arranged with respect to the pins to move the pins between the extended and retracted positions thereof in response to movement of the linkage mechanism from an operative position to an adjusting position thereof, the linkage mechanism including a shaft mounted for rotation and extending longitudinally of the frame and generally parallel to the extending members and a plurality of linkages coupled to said shaft, said linkages being associated with a pin, and an elongated manually movable actuating member mounted with respect to said frame and in connection with said shaft so as to be movable generally longitudinally between an inoperative and an operating position extending outwardly from said frame, the improvement comprising a power operated unit carried by the frame and coupled to said shaft so as to move said linkage mechanism from its inoperative position thereof to its adjusting position thereof, and wherein the connection between said actuating member and said shaft is constructed and arranged to be selectively made a lost-motion connection or a pivotal connection such that (1) when said connection is a pivotal connection, movement of said actuating member from its inoperative position to its operating position causes said shaft to rotate directly moving said linkage mechanism from its inoperative position to its adjusting position and (2) when said connection is a lost-motion connection, movement of said actuating member from its inoperative position to its operating position does not rotate the shaft but actuates said power operated unit which rotates the shaft and moves said linkage mechanism from its inoperative position to its adjusting position.

13. The improvement according to claim 12, wherein the actuating member and the shaft are connected via a crank arm having first and second ends, said first end of said crank arm being coupled to said shaft so as to be free to turn with respect thereto thereby defining said lost-motion connection, with said second end of the crank arm being coupled to said actuating member, and wherein a link is pivotally coupled to said shaft at one end thereof in such a manner so as to rotate the shaft upon movement of the link, with the other end of the link being a free end, said link enabling said lost-motion connection to be selectively made said pivotal connection upon coupling said free end to said crank arm such that movement of said crank arm by manual movement of said actuating member from its inoperative position to its operating position causes direct rotation of said shaft via said link.

* * * * *